United States Patent [19]

Takahashi et al.

[11] Patent Number: 4,771,389
[45] Date of Patent: Sep. 13, 1988

[54] CONTROL METHOD AND UNIT FOR CONTROLLING A MANIPULATOR

[75] Inventors: Tohru Takahashi, Yukuhashi; Kunihiko Kurami, Kawasaki, both of Japan

[73] Assignee: Nissan Motor Co., Ltd., Yokohama, Japan

[21] Appl. No.: 853,900

[22] Filed: Apr. 21, 1986

[30] Foreign Application Priority Data

Apr. 26, 1985 [JP] Japan .................................. 60-88735

[51] Int. Cl.$^4$ ............................................. G09C 00/00
[52] U.S. Cl. ................................ 364/513; 364/167.01; 364/553
[58] Field of Search ......................... 364/167, 513, 553

[56] References Cited

U.S. PATENT DOCUMENTS

| | | | |
|---|---|---|---|
| 4,243,923 | 1/1981 | Whitney et al. | 364/478 X |
| 4,280,182 | 7/1981 | Mickowski | 364/167 X |
| 4,401,930 | 8/1983 | Kato et al. | 364/167 X |
| 4,408,286 | 10/1983 | Kikuchi et al. | 364/513 |
| 4,549,271 | 10/1985 | Nozawa et al. | 364/167 X |
| 4,578,749 | 3/1986 | Kuno et al. | 364/167 |
| 4,604,716 | 8/1986 | Kato et al. | 364/167 X |
| 4,608,651 | 8/1986 | Murakami et al. | 364/167 X |

Primary Examiner—Michael R. Fleming
Assistant Examiner—Steve Long Hoang
Attorney, Agent, or Firm—Foley & Lardner, Schwartz, Jeffery, Schwaab, Mack, Blumenthal & Evans

[57] ABSTRACT

A control method and unit for controlling an industrial robot or a manipulator in which a parameter a of a transfer function of a reference model is determined in accordance with the positioning time and a moving angle of the manipulator from the starting point to the end point of control and each of control gains are determined in accordance with the parameter thus determined so as to average or make the positioning time uniform among arm shafts of the manipulator. With this construction, the dispersion of the positioning time among the arm shafts are removed and a high speed positioning control of the manipulator is realized.

8 Claims, 4 Drawing Sheets

CONTROL METHOD AND UNIT FOR CONTROLLING A MANIPULATOR

BACKGROUND OF THE INVENTION (1) Field of the Invention

The present invention relates to a control method and a control unit for controlling a manipulator, more particularly a control method and a control unit for controlling the operation of the manipulator, capable of performing a high speed positioning control of the manipulator with a high accuracy.

(2) Description of the Prior Art

Recently, differnet control units for industrial robots, i.e. manipulators, having functions resembling the upper limbs of a human body, have been proposed in which microprocessors are widely used as control means.

FIG. 1 shows an example of a block diagram of the control unit for a manipulator according to the prior art. In the figure, a model following-up type control unit 51, which is constructed by a microprocessor, performs the positioning control of a manipulator 53 as an control object in such a manner that actual joint angle $\theta$ of the manipulator 53 can follow along a target joint angle $\theta_r$. The control unit of this kind comprises a reference model 55, an integrator gain means 59, 61, and 63 and adders 65 and 67.

The control unit 51 controls the joint angle $\theta$ of the manipulator 53, so as to determine a control input signal u to the manipulator 53 by the following equation, in accordance with the joint angle $\theta$, joint angle speed $\dot{\theta}$, reference model joint angle $\theta_M$, and reference model joint angle speed $\dot{\theta}_M$;

$$u = F_1 \cdot \begin{bmatrix} \theta \\ \dot{\theta} \end{bmatrix} + F_2 \cdot \int_o^t edt + F_3 \cdot \begin{bmatrix} \theta_M \\ \dot{\theta}_M \end{bmatrix} \quad (1)$$

where $F_1$, $F_2$, $F_3$ indicate each control gain of the gain means 59, 61, 63, respectively and e indicates an output of the adder 65, which is $e = \theta - \theta_M$.

The reference model 55 in the control unit 51 for each arm shaft of the manipulator 53 according to the prior art can arbitrarily be constructed as a model of the secondary transfer function as expressed by the following equation.

$$T_{(s)} = \frac{\theta M_{(s)}}{\theta_r(s)} = \frac{K}{S^2 + a_1 S + a_2} \quad (2)$$

Namely, the reference model 55 produces the reference model joint angle $\theta_M$ and the reference model joint angle speed $\dot{\theta}_M$ corresponding to the target joint angle $\theta_r$ by defining the parameters $a_1$, $a_2$, and K in the transfer function $T_{(s)}$ of the model expressed by equation (2).

In the control unit 51 for the manipulator according to the prior art, the approach for defining the parameters of the reference model 55 is fixed. As a result, when a stepping width or moving angle $\theta_W$ of the manipulator 53 from the starting point to the end point of each arm shaft of the manipulator 53 differs from shaft to shaft, in other words, when the target joint angle $\theta_r$ of each shaft of the arms of the manipulator differs from each other, the so-called positioning time $T_r$ correspondingly differs. Namely, a necessary time for settling the deviation of the actual joint angle $\theta$ to the target joint angle $\theta_r$ within a predetermined allowance or angle tolerance $\pm\Delta\theta$ with respect to each arm shaft of the manipulator differs from each other as shown in FIG. 2, although the dynamic characteristics of the reference model 55 are equal and this results in the difference among the positioning times of each arm shaft. As a result, the positioning time of each arm shaft can no longer be uniform, with the result that the movement of the arms of the manipulator 53 becomes irregular. Hence, a high speed positioning control of the shafts in the prior art due to so-called PTP operation became difficult.

SUMMARY OF THE INVENTION

It is an object of the present invention, therefore, to provide control method and a control unit for controlling a manipulator in which the drawbacks described above have been overcome and the positioning time for each arm shaft of the manipulator is substantially made equal.

It is another object of the present invention to provide a method of controlling a manipulator in which a parameter a in a transfer function of a reference model is determined in accordance with a positioning time, and a moving angle from a starting point to an ending point of the control and each of control gains are determined in accordance with the parameter a thus determined so as to remove dispersions among the positioning times of each arm shaft and to realize a high speed positioning control of the manipulator.

It is still another object of the present invention to provide a control unit having a microprocessor which includes a CPU, a RAM, and a ROM in which each control input u for each shaft arm of a manipulator is determined in accordance with joint angle $\theta$ and joint angle speed $\dot{\theta}$ as well as various parameter data of a reference model for the manipulator and tables which have preliminarily been stored in the ROM so as to perform positioning control of the arms of the manipulator and to follow up the actual joint angle $\theta$ of the arm to a predetermined joint angle $\theta_r$.

One feature of the present invention resides in a method of controlling a manipulator which comprises the steps of: setting up a predetermined angle tolerance $\Delta\theta$ with respect to a target joint angle for the positioning control of the manipulator, a positioning time and a target joint angle $\theta_r$; calculating a moving angle $\theta_w$ from the starting point to the end point of the control; determining the parameter a of a transfer function $$T_{(s)} = \frac{\theta M_{(s)}}{\theta_r(s)} = \frac{2a^2}{(S+a)(S+2a)}$$

of a reference model; determining control gains $F_1$, $F_2$, $F_3$ in accordance with the parameter a of the reference model; calculating a reference model joint angle $\theta_M$ and a reference model joint angle speed $\dot{\theta}_M$ from the reference model transfer function thus determined; calculating each control input u to the manipulator in accordance with the following equation;

$$u = [F_1 \; F_2 \; F_3] \begin{bmatrix} \theta \\ \dot{\theta} \\ \int_0^t e \, dt \\ \theta_M \\ \dot{\theta}_M \end{bmatrix}$$

determining if the joint angle of the manipulator falls within the predetermined angle tolerance for the target joint angle; and returning the control to the step of calculating the reference model joint angle and the joint angle speed, or terminating the control in accordance with the result of the last determination.

Another feature of the present invention resides in a control unit for a manipulator which comprises the following elements for each arm shaft of the manipulator: at least one D.C. servo motor for driving an arm of the manipulator; a tacho generator for detecting a joint angle speed of the manipulator; a counter for detecting a joint angle of the manipulator; a microprocessor having a CPU, a RAM, and a ROM and for performing various calculations and operations in accordance with the signals corresponding to the actual joint angle and the actual joint angle speed detected, particular parameters of a reference model for the manipulator being preliminarily set-up and various data associated with those parameters having preliminarily been stored in the ROM; a D/A converter connected to the output of the microprocessor for converting the control values into analog signals; and a servo amplifier connected between the output of the D/A converter and the D.C. servo motor for applying the amplified analog signals from the converter to the servo motor.

These objects, features and advantages of the invention will be better understood from the following detailed description with reference to the accompanying drawings.

DESCRIPTION OF THE PREFERRED EMBODIMENT

Figure 3:
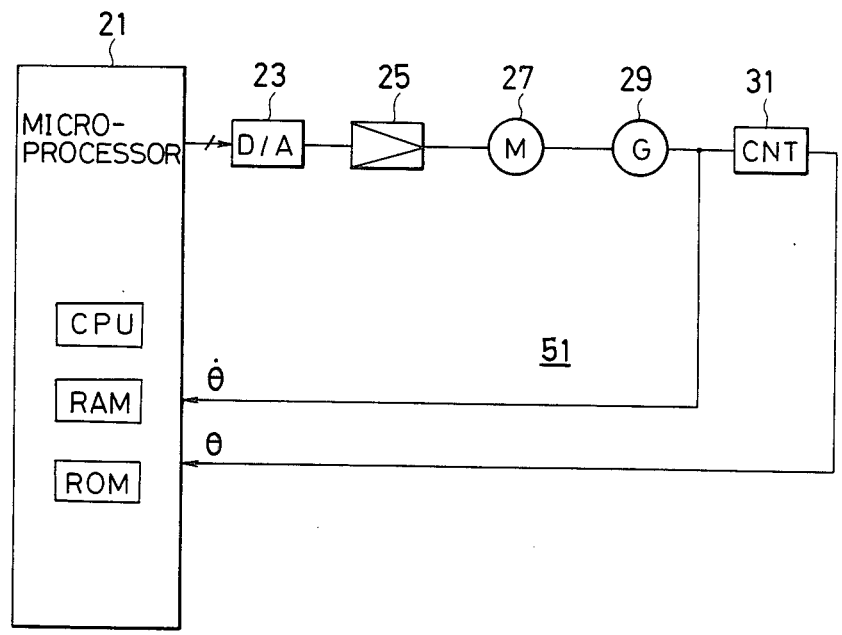
FIG. 3 is a construction of a control unit for the manipulator, according to the present invention.

Refering to FIG. 3, the control unit 51 for a manipulator (e.g. 53 in FIG. 1) according to the present invention is shown, which carries out a positioning control of an arm shaft of the manipulator in such a manner that the actual joint angle $\theta$ of the manipulator can follow-along the target joint angle $\theta_r$ in the optimum conditions. It is to be noted that FIG. 3 shows only one joint arm shaft of, for instance, the arms of the manipulator. Accordingly, the same constructing elements 23 through 31 are to be provided for each of the joint shafts of the manipulator.

The control unit 51 comprises a microprocessor 21 having a CPU, a RAM, and a ROM, a D/A converter 23, a servo amplifier 25, a D.C. servo motor 27, a tacho generator 29, and a counter 31 for detecting the joint angle $\theta$. The D.C. servo motor 27 is for driving the arm shaft of the manipulator (see FIG. 1) in accordance with the control output signal from the servo amplifier 25. The tacho generator 29 is for detecting the joint angle speed $\dot{\theta}$. The counter 31 is for detecting the joint angle $\theta$ as described above. The microprocessor 21 is for carrying out various calculations and operations which will be described in detail later, in accordance with the signals corresponding to the joint angle $\theta$ and the joint angle speed $\dot{\theta}$ of the one arm shaft of the manipulator 53, applied thereto:

The D/A converter 23 is connected between the microprocessor 21 and the servo amplifier 25 and it is for converting control input values into analog signals. The analog signals thus converted by the D/A converter 23 are applied to the servo amplifier 25.

In the control unit 51 thus constructed, according to the present invention, the joint angle $\theta$ is first detected at predetermined time periods and the joint angle speed $\dot{\theta}$ is sought from the change in time of the joint angle $\theta$ in accordance with the detected signal from the tacho generator 29 fed to the microprocessor 21. The microprocessor 21 calculates and determines each control input u in accordance with the joint angle $\theta$ and the joint angle speed $\dot{\theta}$ as well as various data and tables which have preliminarily been stored in the ROM therein, by controlling the D.C. servo motor 27, so as to carry out the positioning control of the arm of the manipulator 53 to be driven by the motor 27 and to follow up the actual joint angle $\theta$ of the arm shaft to the predetermined joint angle $\theta_r$.

Figure 1:
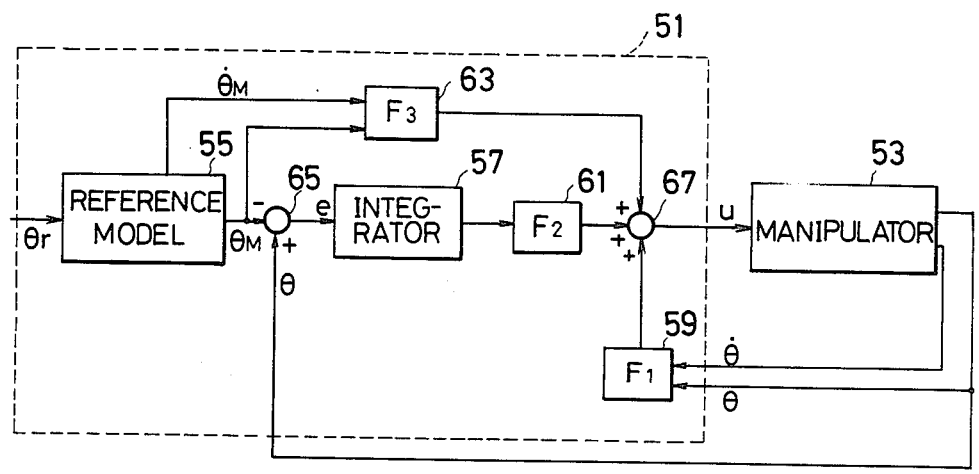
FIG. 1 illustrates a functional block construction of a control unit for a manipulator according to the prior art.
Figure 2:
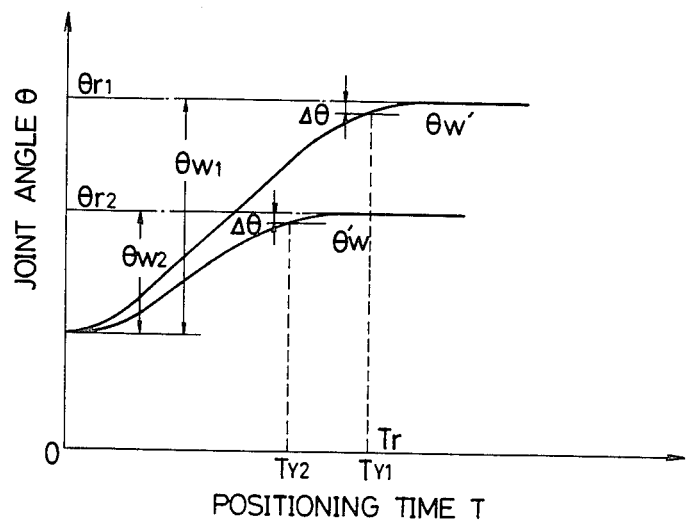
FIG. 2 illustrates the characteristic curves of the positioning time and joint angle for explaining the operation of the control unit according to the prior art.
Figure 4:
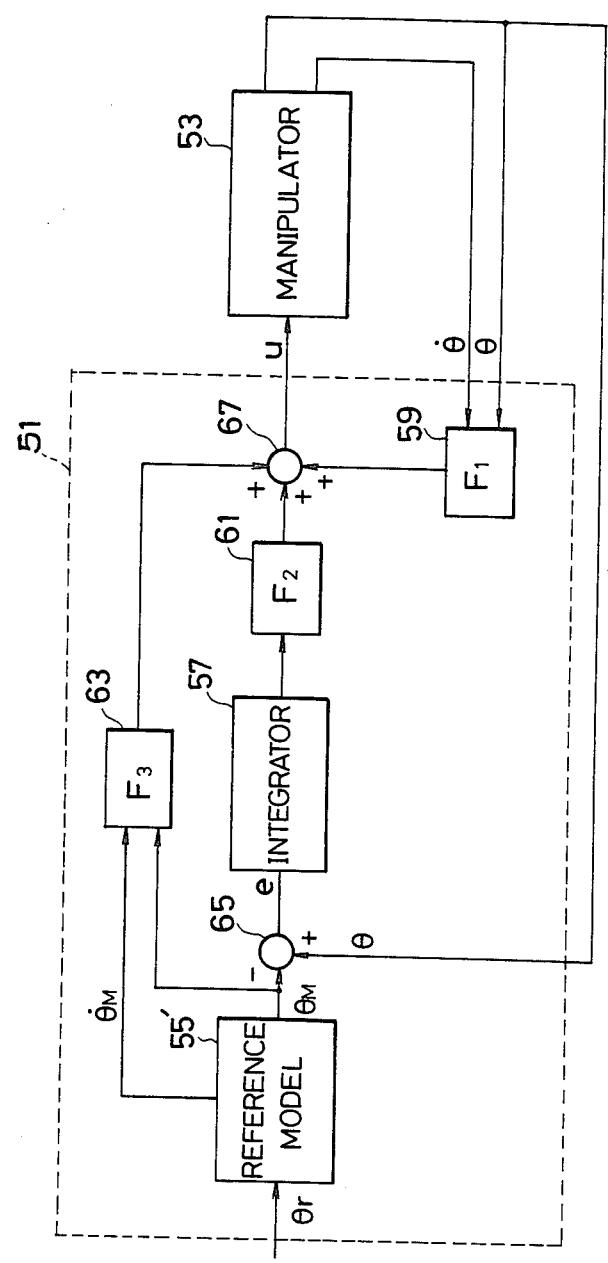
FIG. 4 illustrates a functional block diagram of the control unit of FIG. 3 according to the present invention.

FIG. 4 shows a functional block diagram of the control unit 51 according to the present invention, similar to that shown in FIG. 1.

The control unit 51 comprises a reference model 55' which produces a reference model joint angle $\theta_M$ and a reference model joint angle speed $\dot{\theta}_M$ in accordance with the target joint angle $\theta$ of each arm shaft at each time point, adders 65 and 67 and an integrator 57 for removing a standing offset, gain means 59, 63, and 67. Elements 55' through 67 are similar to those shown in FIG. 1. However, the present invention differs from the prior art in that the reference model 55' for a certain arm shaft is set-up as a model expressed by the following transfer function;

$$T_{(s)} = \frac{\theta_{M(s)}}{\theta_r(s)} = \frac{2a^2}{(S+a)(S+2a)} \quad (3)$$

First of all, in the PTP control, the parameter a of the reference model 55' is determined so as to be in agreement with a settling time of the reference model 55' for each arm shaft with a predetermined positioning time Tr. For instance, when the moving angle from the starting point of a certain shaft to the end point equals to $\theta w$, the reference model 55' may be determined by seeking the parameter a wherein the time until reaching $\theta w' = \theta w - \Delta \theta$ becomes Tr.

When the transfer function of the system is expressed by equation (3), the step response can be expressed by the following equation.

$$\theta(t) = (e^{-t} - 2e^{-at} + e^{-2at})\theta w \quad (4)$$

Seeking the parameter a where $\theta(t) = \theta w'$ at $t = Tr$, it follows that;

$$a = -\frac{1}{Tr} \log e\left(1 - \sqrt{\frac{\theta w - \Delta\theta}{\theta w} - e^{Tr} + 1}\right) \quad (5)$$

This indicates that the parameter a can be expressed by the function of (Tr, θw).

Now, the model following-up control gains $F_1$, $F_2$ and $F_3$ are to be calculated in accordance with the parameter a which is determined by the equation (5).

For this purpose, the reference model 55' can be expressed by the following state equations;

$$\frac{d}{dt}\begin{bmatrix}\theta_M \\ \dot{\theta}_M\end{bmatrix} = A_M \cdot \begin{bmatrix}\theta_M \\ \dot{\theta}_M\end{bmatrix} + B_M \cdot \theta_r$$

$$\theta_M = C_M \cdot \begin{bmatrix}\theta_M \\ \dot{\theta}_M\end{bmatrix} \quad (6)$$

The state equations of the manipulator 53 can be expressed by the following functions;

$$\frac{d}{dt}\begin{bmatrix}\theta \\ \dot{\theta}\end{bmatrix} = A \cdot \begin{bmatrix}\theta \\ \dot{\theta}\end{bmatrix} + Bu$$

$$\theta = C \cdot \begin{bmatrix}\theta \\ \dot{\theta}\end{bmatrix} \quad (7)$$

The positional deviation e can be defined by the following equation;

$$e = \theta - \theta_M \quad (8)$$

The following extension system can be obtained from the equations (6), (7) and (8);

$$\frac{d}{dt}\begin{bmatrix}\dot{\theta} \\ \ddot{\theta} \\ e \\ \dot{\theta}_M \\ \ddot{\theta}_M\end{bmatrix} = \begin{bmatrix}A & 0 & 0 \\ C & 0 & -C_M \\ 0 & 0 & A_r\end{bmatrix}\begin{bmatrix}\dot{\theta} \\ \ddot{\theta} \\ e \\ \dot{\theta}_M \\ \ddot{\theta}_M\end{bmatrix} + \begin{bmatrix}B \\ 0 \\ 0\end{bmatrix}\dot{u} \quad (9)$$

In order to design a control system, the secondary type evaluation function J is expressed by the following equation being a minimum;

$$J = \int_0^\infty (e^2 + \lambda \dot{u}^2)\,dt \quad (10)$$

wherein J indicates an adjustment parameter.

Seeking the optimum control input u which minimizes equation (10) in accordance with the integral type optimum regulator logic, the following equation is obtained;

$$u = [F_1\ F_2\ F_3]\begin{bmatrix}\theta \\ \dot{\theta} \\ \int_0^t e\,dt \\ \theta_M \\ \dot{\theta}_M\end{bmatrix} \quad (11)$$

The control gains $F_1$, $F_2$, $F_3$ can be derived from the parameters A, B, C of the manipulator 53, the parameters $A_M$, $B_M$, $C_M$ of the reference model and the adjustment parameter λ, such as the potter's approach. In this case, assuming that the parameters A, B, C, of the minipulator 53 and the adjustment parameter λ are fixed, the control gains $F_1$, $F_2$, and $F_3$ become a function of the parameter a respectively.

Accordingly, the parameter a of the reference model 55' is determined in accordance with the positioning time Tr and the moving angle or the stepping width θw, and then the control gains $F_1$, $F_2$, and $F_3$ are determined in accordance with the parameter a. This results in exclusion of the discrepancy or dispersion among the positioning times of each arm shaft of the manipulator 53, thus enabling a high speed positioning control of the shaft.

When determining the parameter a it is calculated from a predetermined suitable combination of (Tr, θw) and then it is stored in the ROM of the microprocessor 21 in the form of a two-dimensional table. The parameter a is finally determined by the primary interpolation, thereby shortening the calculation time for seeking the value of a as well as realizing a high speed control.

Likewise, when determining the control gains $F_1$, $F_2$, and $F_3$, they are sought from a predetermined suitable value of a respectively and are stored into the ROM in the form of a table, so as to shortening the calculation time.

Figure 5:
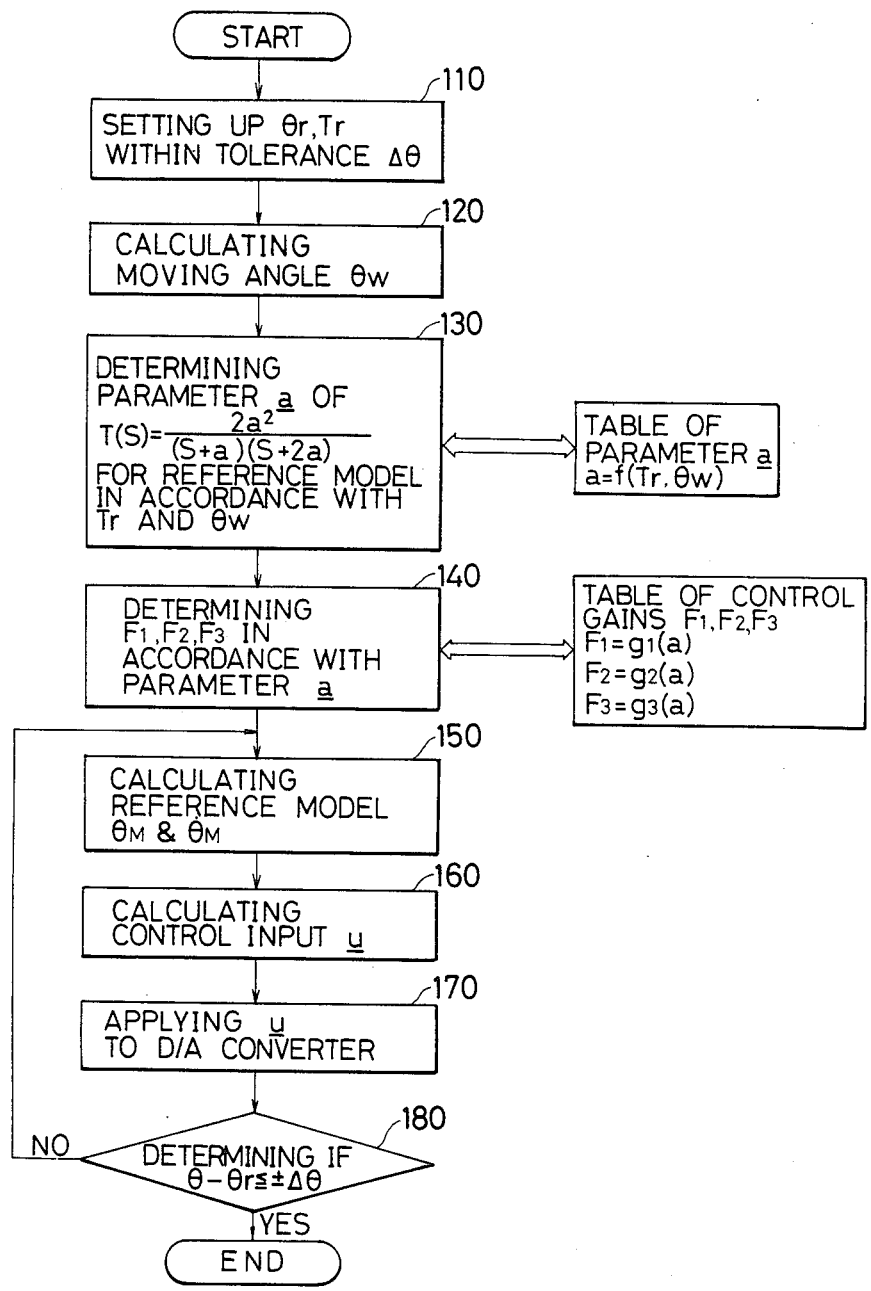
FIG. 5 illustrates a control flow chart of a control method for controlling the manipulator through the control unit, according to the present invention.

The operation of the control unit according to the present invention will now be described with reference to the control flow chart shown in FIG. 5.

After starting the control, the target joint angle θr, the positioning time Tr, and the predetermined tolerance Δθ to the target joint angle θr for the position control are set up in step 110. After this step, the operation now goes to step 120 where the step width or moving angle θw from the starting point to the end point for each shaft of the manipulator 53 is calculated. The operation then proceeds to step 130.

In step 130, the parameter a of the reference model 55' expressed by the equation (3) is determined in accordance with the positioning time Tr and the step width θw thus set up. Namely, the parameter a is determined by a look-up table preliminarily prepared and stored in the ROM in accordance with the function a=f (Tr, θw). The parameter a thus determined is a value such that the positioning time to the step width θw is Tr. After this operation, the operation moves to step 140, where the control gains $F_1$, $F_2$, and $F_3$ are determined from a look-up table prepared by $F_1 = g_1(a)$, $F_2 = g_2(a)$, and $F_3 = g_3(a)$ in accordance with the parameter a The control gains $F_1$, $F_2$, $F_3$ thus determined are calculated values which follow the reference model in the optimum conditions. After execution of this step, the operation now moves to step 150.

In the step 150, the reference model joint angle $\theta_M$ and the reference model joint angle speed $\dot{\theta}_M$ are calculated and the operation now goes to step 160. In step 160, a feed-back control is performed by the control variable thus calculated so as to follow up the model, and the control input u is calculated. After this operation, it moves to step 170, where the control input u is applied to the D/A converter 23 (see FIG. 3). After executing this operation, the operation now moves to step 180.

In step 180, a determination is made if the actual joint angle $\theta$ of the manipulator 53 is within the predetermined tolerance $\Delta\theta$ to the target joint angle of $\theta r$, during a predetermined time period. If the result of the determination is No, that is, the actual joint angle $\theta$ is out of the tolerance $\Delta\theta$, the operation returns to step 150 and the subsequent operations are repeated. On the other hand, however, if the result of the decision is YES, i.e. it is within the tolerance, the operation terminates.

As described in the foregoing, in the control unit for performing the positioning control by producing as a reference model the joint angle and the joint angle speed of each shaft of a manipulator in the model following-up control system, according to the present invention, the parameter a of the reference model is determined in accordance with the positioning time preliminarily set-up by a model setting means and the control gains are determined respectively in accordance with the parameters of the reference model by control gain setting means. As a result, the positioning time of each arm shaft of the manipulator is made uniform and the movement of each arm is stably controlled near the positioning point of the arm, thus realizing a high speed positioning control of a manipulator due to the PTP operation.

While the invention has been described in its preferred embodiment, it is to be understood that the words which have been used are words of description rather than limitation and that various changes and modifications may be made within the purview of the appended claims without departing from the true scope and spirit of the invention in its broader aspects.

What is claimed is:

1. A method of controlling a robot or a manipulator having a plurality of arm shafts, which comprises the steps of:
   (a) determining a parameter, a, of a reference model in accordance with a positioning time (Tr) and a moving angle (Jw) from a starting point to an ending point of the control to the manipulator, where a is a parameter of a transfer function of said reference model; and
   (b) determining control gains ($F_1$, $F_2$, $F_3$) in accordance with the parameter a thus determined, where $F_1$, $F_2$ and $F_3$ are control gains of first, second and third gain control means, respectively, thus removing the dispersion among the positioning times of each arm shaft and realizing a high speed positioning control of the manipulator.

2. The method of controlling a manipulator as claimed in claim 1 wherein the method further comprises the steps of:
preliminarily preparing a table of the parameter of a in accordance with a function of $$a = f(Tr, \theta w)$$

and storing said table in a ROM of a microprocessor.

3. The method of controlling a manipulator as claimed in claim 2 wherein the method further comprises the step of carrying out a table look-up operation for control gains $F_1 = g_1$ (a), $F_2 = g_2$ (a), $F_3 = g_3$ (a) which have preliminarily been prepared and stored in the ROM of the microprocessor together with the table of the parameter a, in accordance with the parameter a.

4. A method of controlling a manipulator which comprises the steps of:
   (c) setting up a predetermined tolerance $\Delta\theta$ with respect to a target joint angle $\theta r$ for the positioning control of the manipulator, a positioning time Tr, and a target joint angle $\theta r$;
   (d) calculating a moving angle $\theta w$ from the starting point to the ending point of the control;
   (e) determining the parameter a of the following equation or transfer function $$T_{(s)} = \frac{\theta M_{(s)}}{\theta_r(s)} = \frac{2a^2}{(S+a)(S+2a)}$$

of a reference model;
   (f) calculating a reference model joint angle $\theta_M$ and a reference model joint angle speed $\dot{\theta}_M$ from the reference model transfer function this determined;
   (g) determining the control gains ($F_1$, $F_2$, $F_3$) in accordance with the parameter a of the reference model;
   (h) calculating each control input u to the manipulator in accordance with the following equation, $$u = [F_1\ F_2\ F_3] \begin{bmatrix} \theta \\ \dot{\theta} \\ \int_0^t e\,dt \\ \theta_M \\ \dot{\theta}_M \end{bmatrix},$$

where e indicates positional deviation (i) determining if the joint angle $\theta$ of the manipulator falls within the predetermined tolerance $\Delta\theta$ to the target joint angle $\theta r$; and
   (j) returning the control to the step (f) above or terminating the control in accordance with the result of the last determination.

5. The method of controlling a manipulator as claimed in claim 4 wherein the method further comprises the step of applying a control signal corresponding to the control input u thus calculated to a D/A converter so as to control the manipulator in accordance with the result of the calculation.

6. A control unit for a manipulator, said control unit comprising:
first detecting means for detecting a joint angle of an arm of the manipulator;
second detecting means for detecting a joint angular velocity of the arm;
reference setting means for setting a reference parameter in accordance with at least a preset time for positioning the arm;
first, second and third gain means for respectively calculating first and second and third control gains in accordance with the reference parameter of the reference setting means;

means for inputting a target joint angle of the arm and calculating a reference joint angle and a reference joint angular velocity of the arm in acordance with the target joint angle; and means for calculating a control input for positioning the arm of the manipulator based on the reference joint angle and the reference joint angular velocity, and the first, second and third control gains so that the joint angle of the arm is located within an allowable range of the target joint angle during the preset time.

7. A control unit as claimed in claim 6, wherein said reference parameter is set in accordance with the preset time and a displaced amount of the joint angle of the arm.

8. A control unit as claimed in claim 6 further including memory means for storing tables of said reference parameter and said first, second and third control gains, said calculating means operable for accessing said memory means for calculating said control input.

* * * * *